(12) United States Patent
Tamura et al.

(10) Patent No.: US 9,120,505 B2
(45) Date of Patent: Sep. 1, 2015

(54) VEHICLE DRIVING ASSISTANCE DEVICE

(71) Applicant: FUJI JUKOGYO KABUSHIKI KAISHA, Tokyo (JP)

(72) Inventors: Yuichiro Tamura, Tokyo (JP); Hiroyuki Sekiguchi, Tokyo (JP); Koichi Abe, Tokyo (JP)

(73) Assignee: FUJI JUKOGYO KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/139,571

(22) Filed: Dec. 23, 2013

(65) Prior Publication Data

US 2014/0188345 A1   Jul. 3, 2014

(30) Foreign Application Priority Data

Dec. 28, 2012  (JP) ................. 2012-287343

(51) Int. Cl.
*B62D 15/02* (2006.01)
*G08G 1/16* (2006.01)

(52) U.S. Cl.
CPC .............. *B62D 15/025* (2013.01); *G08G 1/167* (2013.01); *B62D 15/0265* (2013.01)

(58) Field of Classification Search
CPC ............. B62D 15/025; B62D 15/0255; B62D 15/026; B62D 15/0265; G08G 1/167
USPC ............... 701/40–42; 180/6.2, 234, 308, 167; 280/771; 342/71
See application file for complete search history.

(56) References Cited

U.S. PATENT DOCUMENTS

| | | | | |
|---|---|---|---|---|
| 6,138,062 A * | 10/2000 | Usami | | 701/23 |
| 2009/0088966 A1* | 4/2009 | Yokoyama et al. | | 701/201 |
| 2009/0157247 A1* | 6/2009 | Sjogren et al. | | 701/23 |
| 2011/0234390 A1* | 9/2011 | Danner et al. | | 340/438 |

FOREIGN PATENT DOCUMENTS

JP       2007-008281 A       1/2007

* cited by examiner

*Primary Examiner* — Khoi Tran
*Assistant Examiner* — Abby Lin
(74) *Attorney, Agent, or Firm* — McDermott Will & Emery LLP

(57) ABSTRACT

In a vehicle driving assistance device, a steering controlling unit estimates lane lines behind a subject vehicle based on lane lines recognized ahead of the subject vehicle and a running state of the subject vehicle, determines whether or not there is a passing vehicle on an adjacent lane based on the estimated lane lines behind the subject vehicle and a solid substance that is detected behind the subject vehicle by a solid substance detecting unit. If there is a passing vehicle a set distance behind the subject vehicle, the steering controlling unit corrects a steering angle of steering control set based on the lane lines ahead of the subject vehicle toward a direction in which the subject vehicle moves wary from the passing vehicle.

10 Claims, 8 Drawing Sheets

VEHICLE DRIVING ASSISTANCE DEVICE

CROSS REFERENCES TO RELATED APPLICATIONS

The present application claims priority from Japanese Patent Application No. 2012-287343 filed on Dec. 28, 20123, the entire contents of which are hereby incorporated by reference.

BACKGROUND

1. Technical Field of the Invention

The present invention relates to a vehicle driving assistance device that sets a steering angle such that a vehicle runs properly based on a recognized lane line.

2. Related Art

Nowadays, with the progress of electronics technologies, various driving assistance devices are developed and put to practical use in vehicles. Some of the driving assistance devices recognize a lane line with a camera mounted on a vehicle, estimate a traveling route of a subject vehicle, and add a predetermined steering force or perform automatic steering based on the estimated traveling route.

For example, The Japanese Unexamined Patent Application Publication No. 2007-8281 discloses a technique that performs lane maintaining control based on a detected lane line and a virtual lane line. More specifically, when an obstacle is detected, the lane maintaining control is performed to set the virtual lane line within the travelling lane inwardly from the obstacle based on a distance from the subject vehicle to the obstacle.

In this kind of driving assistance device, desirably not only vehicle external information ahead of a subject vehicle but also vehicle external information behind the subject vehicle are sufficiently considered in order to perform the driving assistance control fitting to a driver's feeling. However, if an image of vehicle external environment is captured to recognize the lane line with respect to environment behind the subject vehicle similarly to the environment ahead of the subject vehicle, the structure or processing of the device may be complicated.

SUMMARY OF THE INVENTION

The present invention has been designed in consideration of the circumstances described above, and an object thereof is to provide a vehicle driving assistance device that can implement the driving assistance fitting to the driver's feeling by a simple configuration.

An aspect of the present invention provides a vehicle driving assistance device including: a forward environment recognizing unit to recognize forward environment including right and left lane lines ahead of a subject vehicle; a steering controlling unit to set a steering angle independently of a driver input based on the lane lines ahead of the subject vehicle; a backward lane line estimating unit to estimate lane lines behind the subject vehicle based on the lane lines ahead of the subject vehicle and a running state of the subject vehicle; a solid substance detecting unit to detect a solid substance behind the subject vehicle; a passing vehicle determining unit to determine whether there is a passing vehicle on an adjacent lane based on the lane lines behind the subject vehicle and the solid substance behind subject vehicle; and a correcting unit to correct the steering angle set by the steering controlling unit toward a direction in which the subject vehicle moves away from the passing vehicle if there is a passing vehicle within a set distance behind the subject vehicle.

DETAILED DESCRIPTION

Figure 1:
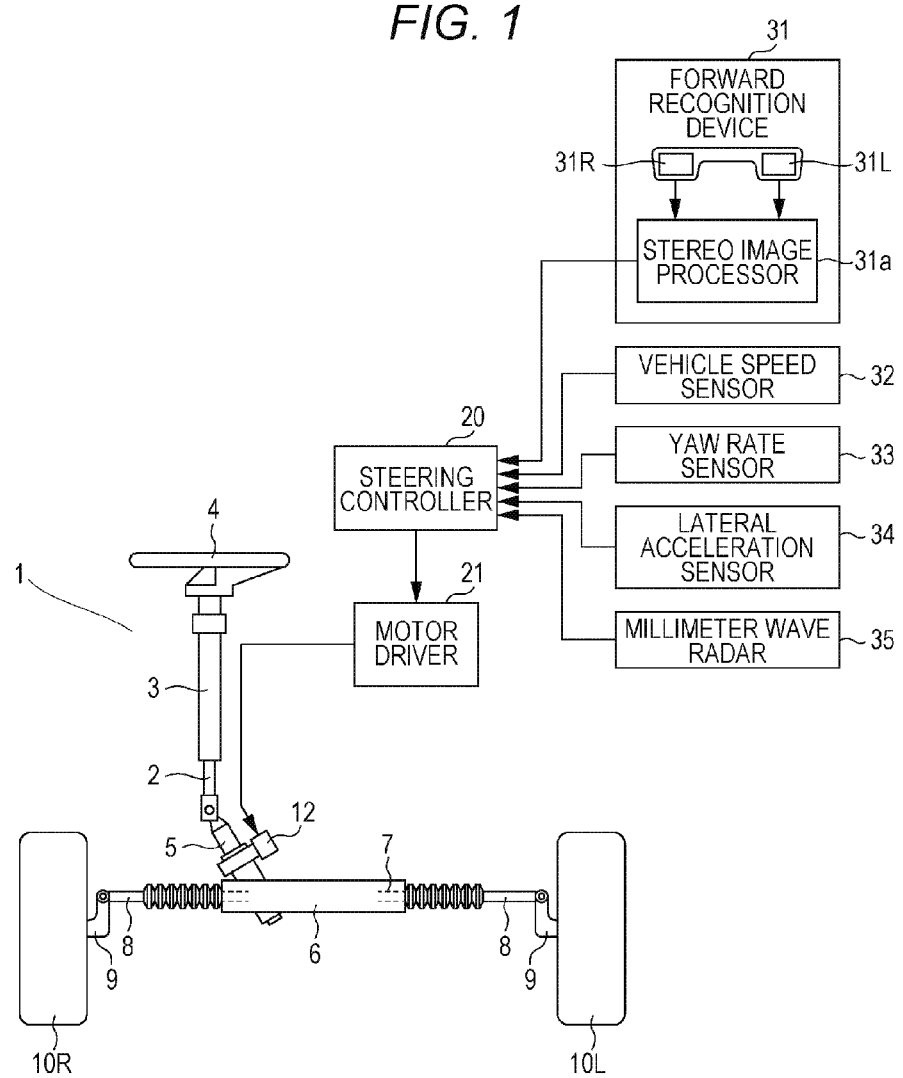
FIG. 1 is a schematic configuration diagram of a steering system of a vehicle.

An example of the present invention will be explained below with reference to the drawings. In FIG. 1, a reference numeral 1 denotes an electric power steering device 1. In the electric power steering device 1, a steering angle can be independently set as a driver input. The electric power steering device 1 has a steering shaft 2 that is rotatably supported by a vehicle frame (not illustrated) with a steering column 3 interposed therebetween. One end of the steering shaft 2 extends toward a driver seat, and a steering wheel 4 is fixed thereto. The other end of the steering shaft 2 extends toward an engine room, and a pinion shaft 5 is coupled thereto.

A steering gear box 6 extending in a vehicle width direction is provided in the engine room, and a rack shaft 7 is inserted and supported into the steering gear box 6 in a reciprocally movable manner. A rack (not illustrated) is provided in the middle of the rack shaft 7, and a pinion (not illustrated) provided in the pinion shaft 5 engages the rack to constitute a rack-and-pinion steering gear mechanism.

Each of right and left ends of the rack shaft 7 projects from the steering gear box 6, and a front knuckle 9 is coupled to an end portion of the rack shaft 7 with a tie rod 8 interposed therebetween. The front knuckle 9 rotatably supports each of right and left wheels 10R and 10L that are of wheels for steering, and the front knuckle 9 is supported by a vehicle frame in a steerable manner via a king pin (not illustrated). Accordingly, when the steering wheel 4 is operated to rotate the steering shaft 2 and the pinion shaft 5, the rack shaft 7 moves in right and left directions due to the rotation of the pinion shaft 5, and the front knuckle 9 is pivoted about the king pin (not illustrated) due to the movement of the rack shaft 7, thereby steering the right and left wheels 10R and 10L in the right and left directions.

An electric motor 12 is coupled to the pinion shaft 5 with an assist transmission mechanism 11 interposed therebetween. The electric motor 12 assists a steering torque to be applied to the steering wheel 4, and adds steering torque such that a set steering angle is obtained. The electric motor 12 is driven through a motor driving unit 21 such that a steering torque (control amount) Ti set by a steering controller 20 is obtained. Although the steering controller 20 includes a steering torque assist function, the description of the steering torque assist function is omitted in the example.

The steering controller 20 is connected to, for example, a forward recognition device 31, a vehicle speed sensor 32, a yaw rate sensor 33, a lateral acceleration sensor 34, and a millimeter wave radar 35. The forward recognition device 31 serves as the forward environment recognizing unit of the present invention that recognizes forward environment including a preceding vehicle and right and left lane lines ahead of a subject vehicle and. The vehicle speed sensor 32 detects a vehicle speed V. The yaw rate sensor 33 detects a yaw rate (dθ/dt). The lateral acceleration sensor 34 detects a lateral acceleration Gy. The millimeter wave radar 35 serves as the solid substance detecting unit of the present invention that detects a solid substance behind the vehicle.

The forward recognition device 31 includes, for example, a pair of CCD cameras 31L and 31R (stereo camera serving as an image capturing unit) and a stereo image processor 31a. The CCD cameras 31L and 31R are attached on front portion of the ceiling of the vehicle compartment with a predetermined distance therebetween, and capture images of an external object in stereo from different viewpoints. The stereo image processor 31a processes pieces of image data from the CCD cameras 31L and 31R.

The stereo image processor 31a processes the pieces of image data from the CCD cameras 31L and 31R as follows, for example: firstly the stereo image processor 31a generates distance information for a pair of images obtained by capturing the environment ahead of the subject vehicle 1 in the traveling direction with the CCD cameras 31L and 31R, using a difference between corresponding positions in the images, to produce a distance image.

In recognizing lane line data, the stereo image processor 31a evaluates a change in luminance of a pixel in the width direction of the road based on the knowledge that the lane line has luminance higher than that of the road surface, and identifies the positions of right and left lane line candidate points on the image plane. A position (x, y, z) of the lane line candidate point in the real world is calculated by a well-known coordinate conversion expression based on a position (i, j) on the image plane and a parallax (that is, the distance information) calculated with respect to the position (i, j). The coordinate system in the real world set based on the position of the subject vehicle is defined, for example, with the road surface immediately below the right camera 31R as an origin, with a vehicle width direction as an X-axis, with a vehicle height direction as a Y-axis, and with a vehicle length direction as a Z-axis (for example, see FIG. 3). Each lane line candidate point converted into the real-space coordinate system is, for example, grouped in each point sequence, and approximated to a quadratic curve (lane line approximate line) using a least square method. In the example, in the case that a lane exists adjacent to a lane on which the subject vehicle runs, the stereo image processor 31a recognizes the lane line that defines the lane adjacent to the lane on which the subject vehicle runs. That is, in the right and left lane line recognition of the example, not only the lane line that defines the lane of the subject vehicle but also the lane line that defines the adjacent lane are separately recognized.

In recognizing sidewall data or solid substance data, the stereo image processor 31a compares the data on the distance image to a frame (window) of three-dimensional sidewall data or solid substance data that are previously stored, extracts the sidewall data, such as a guardrail and a curb, which extend along the road, and extracts the solid substance while classifying the solid substance into an automobile, a two-wheel vehicle, a pedestrian, and other solid substances such as a utility pole. In extracting the solid substance data, the stereo image processor 31a calculates a relative speed of each solid substance with respect to the subject vehicle using a ratio of a change over time in the distance (relative distance) to the subject vehicle, and calculates the speed of each solid substance by adding the relative speed and a subject vehicle speed V. At this point, in particular, as for a solid substance classified as the vehicle, assuming that the forward direction of the subject vehicle is the positive direction, a vehicle the speed of which is substantially zero is recognized as a stopped vehicle, the vehicle that has a positive speed (a vehicle travelling in the same direction as the subject vehicle) and is the closest to the subject vehicle is recognized as a preceding vehicle, and a vehicle having a negative speed (the vehicle that travels toward the subject vehicle) is recognized as an oncoming vehicle. The obtained pieces of information, namely, the pieces of data of the lane line, the guardrail existing along the road, the sidewall such as the curb, and the solid substance (such as the type, the distance, the speed, the relative speed with respect to the subject vehicle, and the preceding vehicle information) are input to the steering controller 20.

The millimeter wave radar 35 is mounted, for example, on a rear bumper member of the vehicle body. The millimeter wave radar 35 includes a transmitter/receiver (not illustrated), and the transmitter/receiver transmits and receives a millimeter wave at constant time intervals within a predetermined scanning range in a horizontal direction of the vehicle. The millimeter wave radar 35 then generates a radar image including a two-dimensional distribution of a solid substance behind the subject vehicle based on a difference in the time when the millimeter wave is transmitted and the time when the millimeter wave reflected by a reflection target such as a solid substance is returned.

The steering controller 20 performs steering assistance such as automatic steering control based on the input signals. That is, the steering controller 20 can set a steering angle independently of the driver input, based on the lane line ahead of the subject vehicle. Specifically, the steering controller 20 calculates an output value as a feedforward output value Iff according to shapes of the right and left lane lines recognized by the forward recognition device 31 based on the input signals, calculates an output value as a feedback output value Ifb according to the shapes of the right and left lane lines recognized by the forward recognition device 31 based on a predicted running position of the subject vehicle, converts a sum of the feedforward output value Iff and the feedback output value Ifb into a torque value, and outputs the converted torque value as a steering torque (control amount) Ti to the motor driver 21. At this point, the steering controller 20 estimates lane lines behind the subject vehicle based on the lane lines ahead of the subject vehicle and the running state of the subject vehicle, and determines whether or not there is a passing vehicle in a lane (adjacent lane) adjacent to the lane on which the subject vehicle runs. If it is determined that there is a passing vehicle within a set distance behind the subject vehicle, the steering controller 20 corrects the steering angle of the steering control toward the direction in which the subject vehicle moves away from the passing vehicle.

Figure 2:
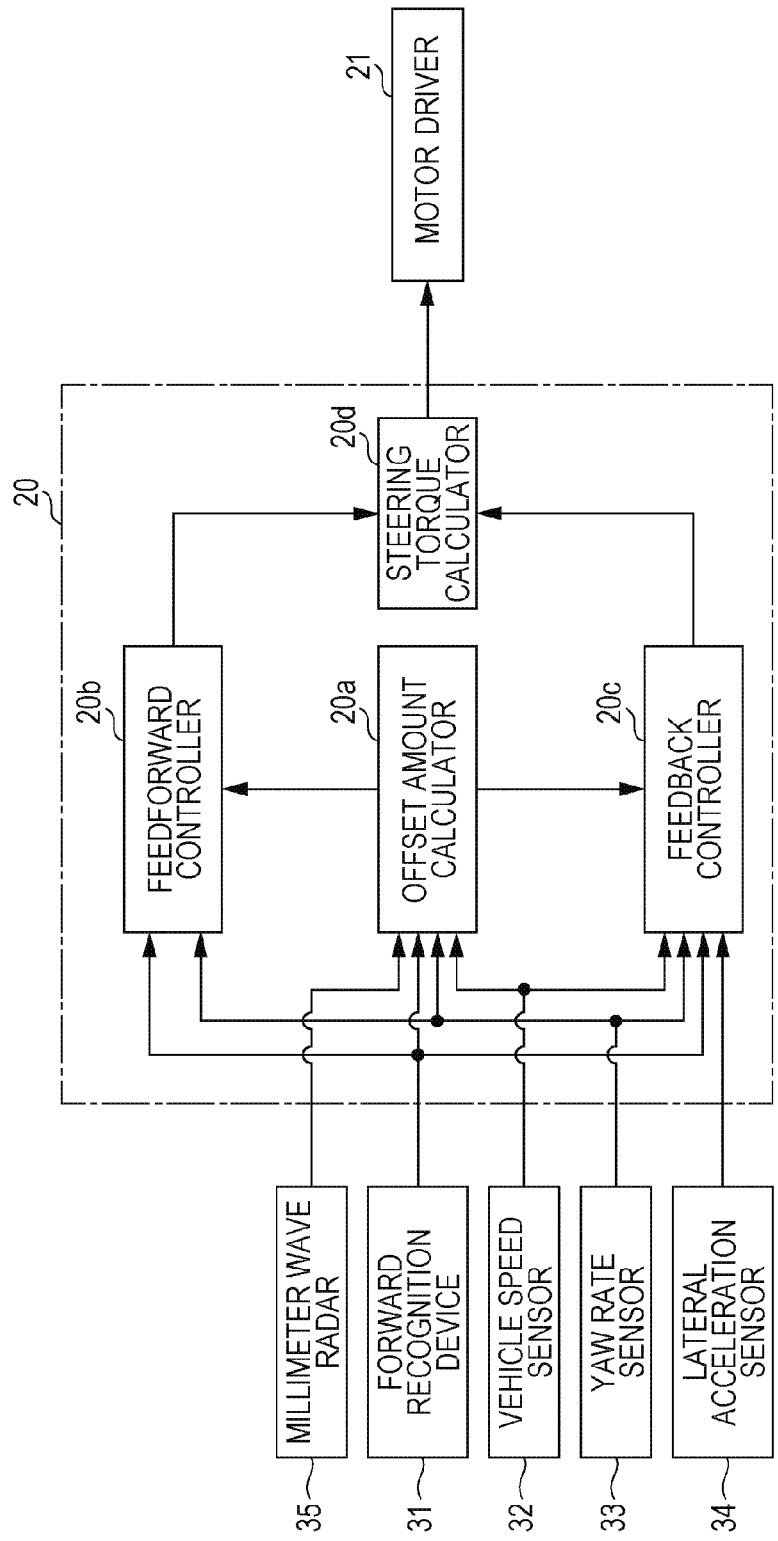
FIG. 2 is a functional block diagram of a steering controller.

Therefore, for example, as illustrated in FIG. 2, the steering controller 20 includes an offset amount calculator 20*a* serving as the backward lane line estimating unit and the correcting unit of the present invention, a feedforward controller 20*b* serving as the steering controlling unit of the present invention, a feedback controller 20*c*, and a steering torque calculator 20*d*.

Figure 4:
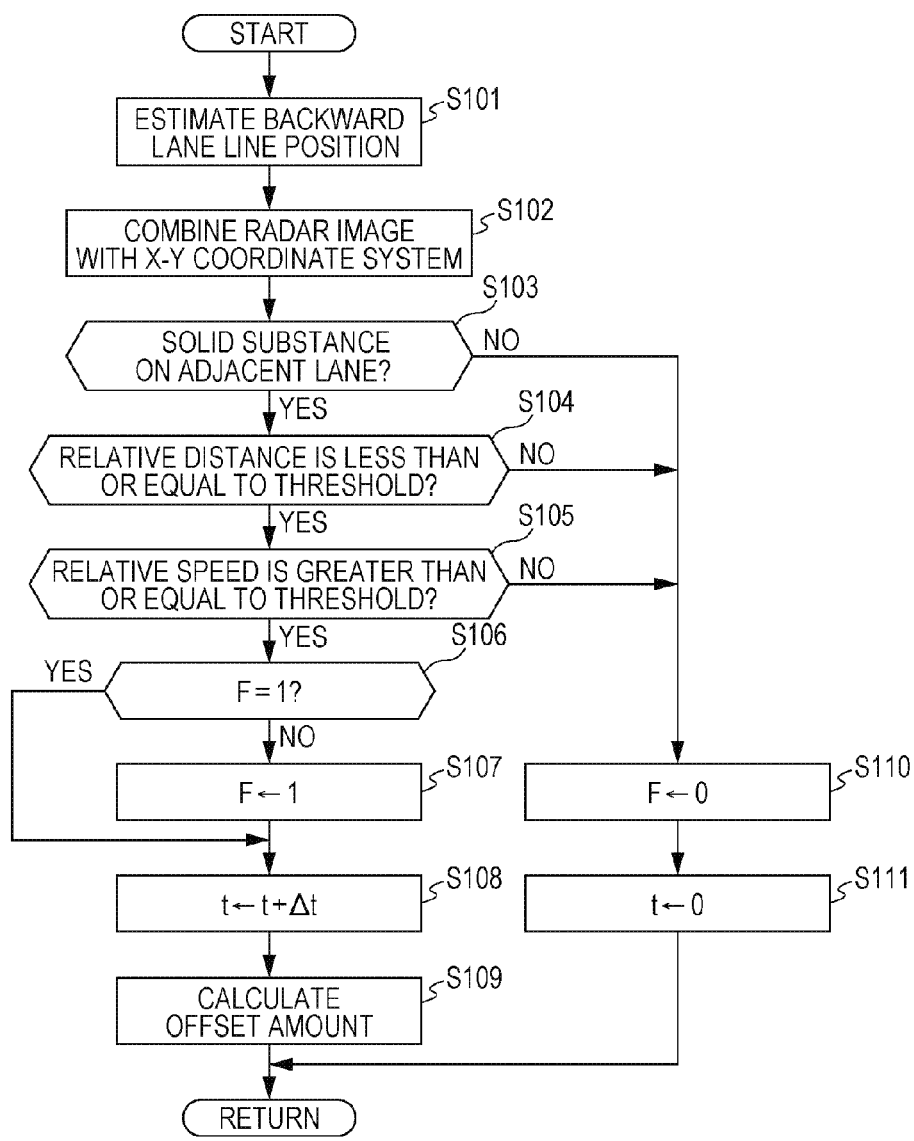
FIG. 4 is a flowchart illustrating an offset amount setting routine.

The offset amount calculator 20*a* receives various pieces of recognition information including the lane line information from the forward recognition device 31, the vehicle speed V from the vehicle speed sensor 32, a yaw rate (dθ/dt) from the yaw rate sensor 33, and the radar image indicating the solid substance information behind the subject vehicle from the millimeter wave radar 35. The offset amount calculator 20*a* then calculates an offset amount x_offset according to a flowchart illustrating an offset amount calculation routine in FIG. 4.

The routine is repeatedly performed at predetermined times. When the routine is started, the offset amount calculator 20*a* estimates the position of a lane line extending behind the subject vehicle in Step S101. For example, the backward lane line position can be estimated using the subject vehicle speed V and a yaw angle θ (that is, an angle calculated from the yaw rate (dθ/dt)).

Figure 5:
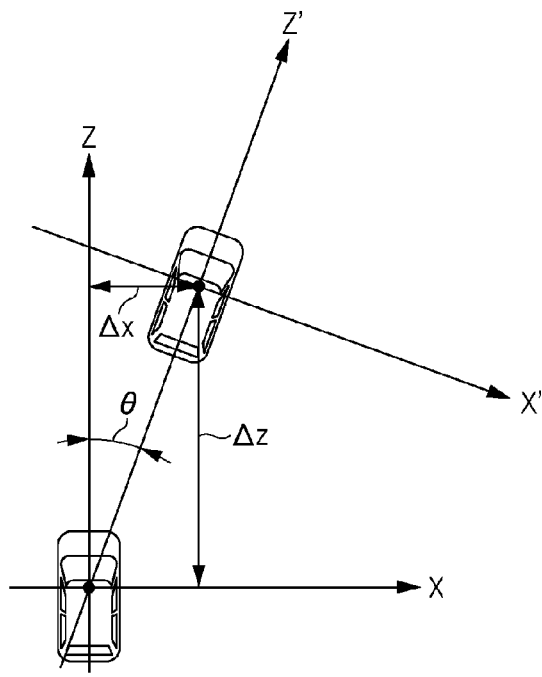
FIG. 5 is an explanatory view of coordinate conversion for moving a previous representative position to a current representative position.

For example, as illustrated in FIG. 5, assuming that Δt is a frame rate, movement amounts Δx and Δz in which the subject vehicle moved in the X-axis direction and the Y-axis direction in one frame are obtained by the following expressions (1) and (2).

$$\Delta x = V \cdot \Delta t \cdot \sin \theta \quad (1)$$

$$\Delta z = V \cdot \Delta t \cdot \cos \theta \quad (2)$$

Figure 6:
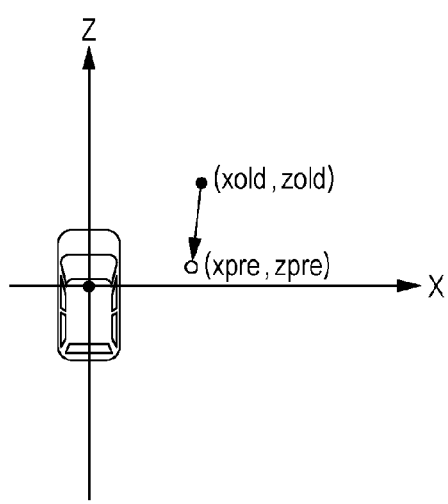
FIG. 6 is an explanatory view illustrating an estimated position of the lane line candidate points in association with movement of a subject vehicle.

Accordingly, for example, as illustrated in FIG. 6, assuming that (xold, zold) is a coordinate of the lane line candidate point detected in the previous frame, a coordinate (xpre, zpre) to which the lane line candidate point is estimated to have moved in the current frame is obtained by the following expressions (3) and (4):

$$X\text{pre} = (X\text{old} - \Delta x) \cdot \cos \theta - (z\text{old} - \Delta z) \cdot \sin \theta \quad (3)$$

$$Z\text{pre} = (x\text{old} - \Delta x) \cdot \sin \theta + (z\text{old} - \Delta z) \cdot \cos \theta \quad (4)$$

That is, after the movement amount Δx and Δz is subtracted from the coordinate (xold, zold), the coordinate conversion is performed to the vehicle fixed coordinate system (X', Z') in the current frame, thereby obtaining the coordinate (xpre, zpre).

The offset amount calculator 20*a* sequentially performs the calculation to each lane line candidate point in each frame in an accumulated manner, and estimates the lane line behind the subject vehicle by approximating the post-calculation point sequence of the lane line candidate points to a quadratic curve (lane line approximate line) using the least square method or the like.

Figure 7:
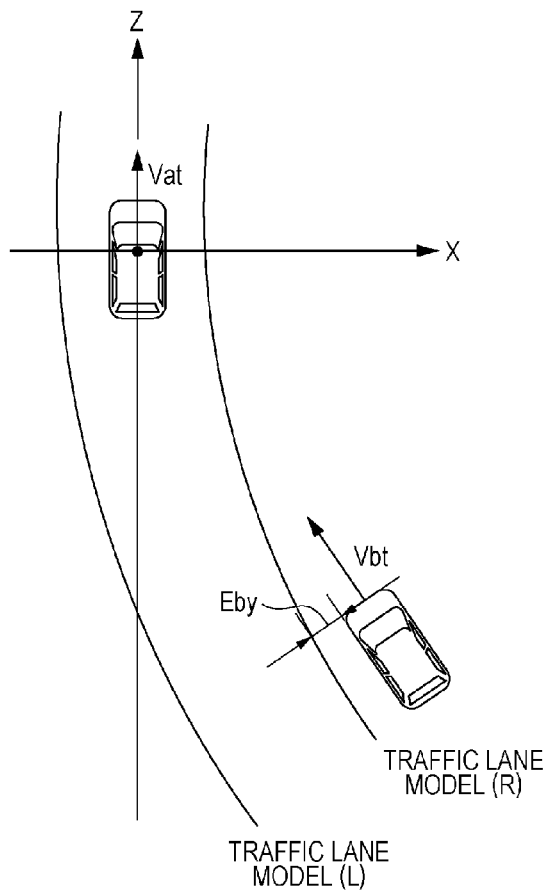
FIG. 7 is an explanatory view of a passing vehicle that runs on an adjacent lane.

In following Step S102, the offset amount calculator 20*a* recognizes a solid substance on the lane adjacent to the lane on which the subject vehicle runs by combining the radar image obtained by the millimeter wave radar 35 with the X-Z coordinate system in which the lane line behind the subject vehicle is estimated. That is, the offset amount calculator 20*a* checks whether the solid substance detected by the millimeter wave radar 35 exists in the adjacent lane behind the subject vehicle. When there is a solid substance, the offset amount calculator 20*a* calculates a position error Eby between the position of the lane behind the subject vehicle and the position of the solid substance (such as a rear vehicle) (for example, see FIG. 7). Further, the offset amount calculator 20*a* calculates a relative speed Vabt with respect to the solid substance based on a change amount among the frames of the relative distance from the subject vehicle to the solid substance.

In following Step S103, the offset amount calculator 20*a* examines whether there is a solid substance in the adjacent lane behind the subject vehicle based on the calculated position error Eby.

If there is no solid substance does in the adjacent lane behind the subject vehicle in Step S103, the offset amount calculator 20*a* proceeds to Step S110.

On the other hand, if there is a solid substance in the adjacent lane behind the subject vehicle in Step S103, the offset amount calculator 20*a* proceeds to Step S104 to examine whether or not a relative distance L from the subject vehicle to the solid substance is less than or equal to a previously-set threshold Lth.

If the relative distance L from the subject vehicle to the solid substance is determined to be greater than the threshold Lth in Step S104, the offset amount calculator 20*a* proceeds to Step S110.

On the other hand, if the relative distance L from the subject vehicle to the solid substance is determined to be less than or equal to the threshold Lth in Step S104, the offset amount calculator 20*a* proceeds to Step S105 to examine whether or not the relative speed Vabt of the subject vehicle with respect to the solid substance is greater than or equal to a previously-set threshold Vth.

If the relative speed Vabt of the subject vehicle with respect to the solid substance is determined to be less than the threshold Vth in Step S105, the offset amount calculator 20*a* proceeds to Step S110.

On the other hand, if the relative speed Vabt of the subject vehicle with respect to the solid substance is determined to be greater than or equal to the threshold Vth in Step S105, the offset amount calculator 20*a* proceeds to Step S106 to examine whether or not a flag F indicating that the passing vehicle coming close to the subject vehicle is recognized as a control target is set to "1".

If the flag F is cleared to "0" in Step S106, the offset amount calculator 20*a* proceeds to Step S107 to set the flag F to "1". Then the offset amount calculator 20*a* proceeds to Step S108.

On the other hand, if the flag F is set to "1" in Step S106, the offset amount calculator 20*a* proceeds to Step S108.

In Step S108, the offset amount calculator 20*a* increments a timer t indicating an elapsed time since the passing vehicle coming close to the subject vehicle is recognized as the control target (t←t+Δt). Then the offset amount calculator 20*a* proceeds to Step S109.

Figure 8:
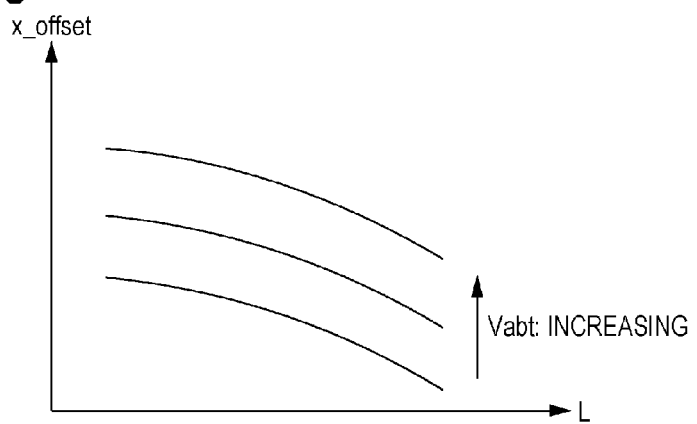
FIG. 8 is an explanatory view illustrating a property of an offset amount.

In Step S109, the offset amount calculator 20*a* calculates the offset amount x_offset (for example, see FIG. 10) with the relative distance L and the relative speed Vabt as parameters based on a previously-set map (for example, see FIG. 8). The offset amount x_offset is used to offset the control target in the direction in which the control target is moved away from the passing vehicle in feedforward control and feedback control that will be described later. Then the offset amount calculator 20*a* exits the routine. The offset amount x_offset is set so as to increase as the relative distance L is decreases, and so as to increase as the relative speed Vabt increases. Further, the offset amount x_offset is multiplied by a previously-set time constant τ to increase as the elapsed time (the value of the timer t) since the passing vehicle coming close to the subject vehicle is recognized as the control target increases.

When the offset amount calculator 20*a* clears the flag F proceeds to Step S110 from Step S103, Step S104 or Step S105, the offset amount calculator 20*a* clears the flag F. In following Step S111, the offset amount calculator 20a clears the timer t, and then exits the routine.

The feedforward controller 20b receives various pieces of the recognition information including the lane line information is from the forward recognition device 31, and the yaw rate (dθ/dt) from the yaw rate sensor 33. Basically, using the following expression (5), the feedforward controller 20b calculates an output value as the feedforward output value Iff according to the recognized shapes of the right and left lane lines, and outputs the feedforward output value Iff to the steering torque calculator 20d:

$$Iff = Gff \cdot (Rr+Rl)/2 \qquad (5)$$

That is, if there is no passing vehicle behind the subject vehicle and the offset amount calculator 20a has not set the offset amount x_offse, the feedforward controller 20b calculates the feedforward output value Iff using the expression (5).

On the other hand, if the offset amount X_offset has been calculated, the feedforward controller 20b calculates the feedforward output value Iff using the following expression (5)':

$$Iff = Gff \cdot ((1-X\_offset/Wrd)Rr + (1+X\_offset/Wrd)Rl)/2 \qquad (5)'$$

Figure 3:
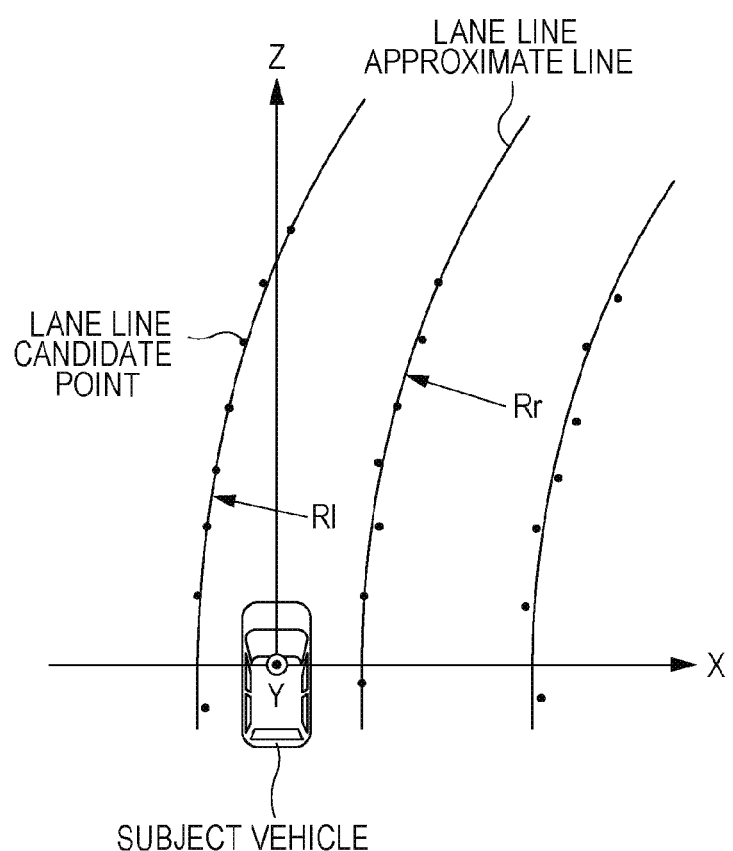
FIG. 3 is an explanatory view illustrating a lane line candidate points and a lane line approximate line.

In the expressions (5) and (5)', Rr is a curvature component of the right lane line and Rl is a curvature component of the left lane line (for example, see FIG. 3). The right and left curvature components Rr and Rl can be defined, for example, using a coefficient of a quadratic term of each lane line approximate line, which is approximated to a quadratic curve by the least square method. Gff is a control gain and variably set with the yaw rate (dθ/dt) as the parameter by referring to a map or the like that is previously set based on an experiment.

The feedback controller 20c receives various pieces of recognition information including the lane line information from the forward recognition device 31, the vehicle speed V from the vehicle speed sensor 32, the yaw rate (dθ/dt) from the yaw rate sensor 33, and a lateral acceleration Gy from the lateral acceleration sensor 34. Basically, using the following expression (6), the feedback controller 20c calculates an output value as the feedback output value Ifb according to the shapes of the right and left lane lines recognized by the forward recognition device 31 based on the predicted running position of the subject vehicle, and outputs the feedback output value Ifb to the steering torque calculator 20d:

$$Ifb = Gfb \cdot (xr - xl - xv) \qquad (6)$$

That is, the feedback controller 20c calculates the feedback output value Ifb using the expression (6), if there is no passing vehicle behind the subject vehicle, and the offset amount calculator 20a has not set the offset amount x_offset.

On the other hand, if the offset amount X_offset has been calculated, the feedback controller 20c calculates the feedback output value Ifb using the following expression (6)':

$$Ifb = Gfb \cdot (xr - xl - xv - X\_offset) \qquad (6)'$$

Figure 9:
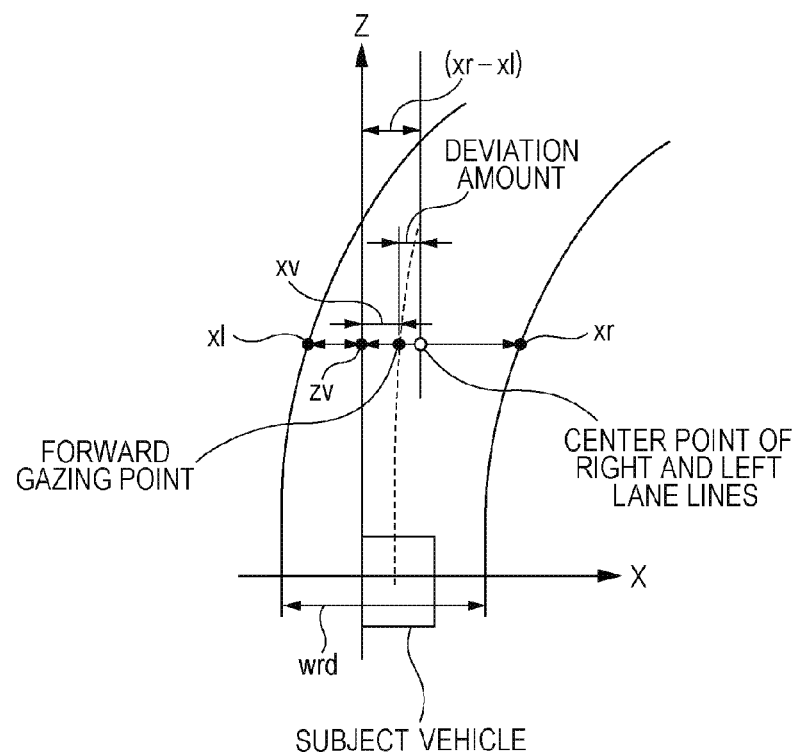
FIG. 9 is an explanatory view of a deviation amount from a center between right and left lane lines at a predicted running position of the subject vehicle, the deviation amount being to be used in feedback control.

In the expressions (6) and (6)', xv is an x-coordinate for a z-coordinate of a forward gazing point of the vehicle. In the example as illustrated in FIG. 9 for example, the forward gazing point is a point where the subject vehicle is positioned after a previously-set foresight time T (for example, 1.2 seconds) elapses. The z-coordinate zv at the forward gazing point is calculated by, for example, zv=T·V. A forward point away from a previously-set distance may simply be used as the forward gazing point.

Accordingly, an x-coordinate zv at the forward gazing point can be calculated, for example, by the following expression (7):

$$Xv = xi + V \cdot (\beta + \theta) \cdot T + (\tfrac{1}{2}) \cdot ((d\theta/dt) + ((d\beta/dt) \cdot V \cdot T2 \qquad (7)$$

Where xi is the current x-coordinate of the vehicle and (dβ/dt) is a vehicle body slipping angular velocity. The vehicle body slipping angular velocity (dβ/dt) can be calculated with the following expression (8):

$$(d\beta/dt) = (Gy/V) - (d\theta/dt) \qquad (8)$$

A vehicle body slipping angle β is calculated by integrating the vehicle body slipping angular velocity (dβ/dt).

Figures 10A, 10B:
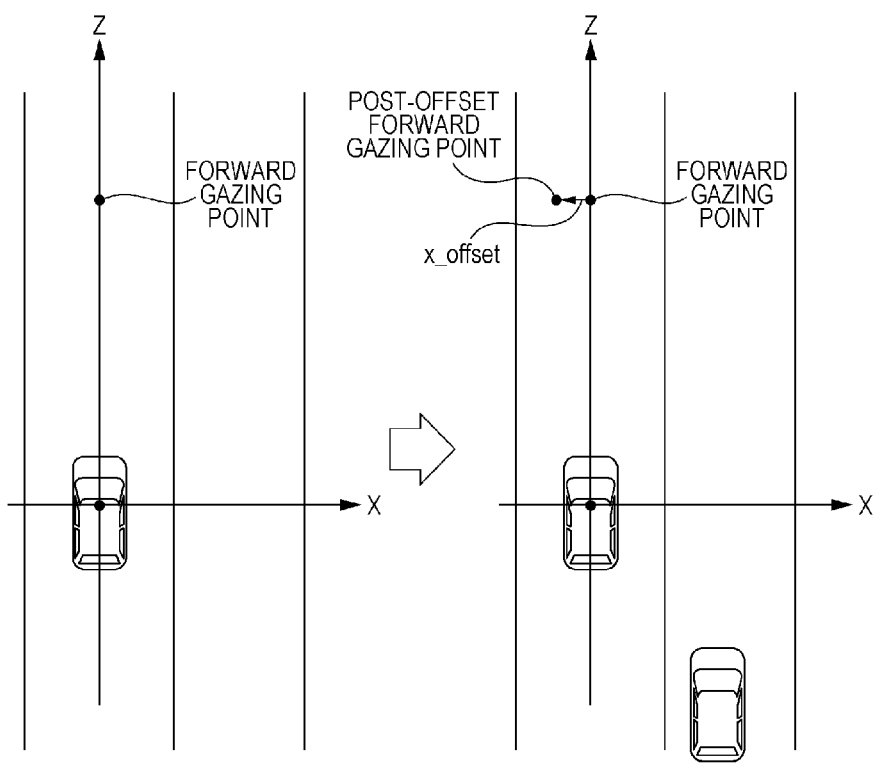
FIGS. 10A and 10B are explanatory views illustrating forward gazing points when the passing vehicle exists and does not exist on the adjacent lane.

As is clear from, for example, the expression (6)', if there is a passing vehicle behind the subject vehicle, the forward gazing point is offset by x_offset with respect to the coordinate xv (for example, see FIG. 10).

The steering torque calculator 20d receives the feedforward output value Iff from the feedforward controller 20b, and the feedback output value Ifb from the feedback controller 20c. The steering torque Ti is calculated, for example, using the following expression (9), and output to the motor driver 21:

$$Ti = Gt \cdot (Iff + Ifb) \qquad (9)$$

Where Gt is a previously-set conversion coefficient.

According to the example, lane lines behind a subject vehicle is estimated based on lane lines recognized ahead of the subject vehicle and the running state of the subject vehicle, and, whether or not there is a passing vehicle in an adjacent lane is determined based on the estimated lane lines behind the subject vehicle and a solid substance behind the subject vehicle detected by the millimeter wave radar 35. If there is a passing vehicle within the set distance behind the subject vehicle, the steering angle of the steering control set based on the lane line ahead of the subject vehicle is corrected toward the direction in which the subject vehicle moves away from the passing vehicle. Therefore, the driving assistance fitting to the driver's feeling can be implemented by the simple configuration.

[ ]

That is, lane lines behind the subject vehicle are estimated based on lane lines recognized ahead of the subject vehicle and the running state of the subject vehicle, whereby, not only the lane lines ahead of the subject vehicle but also the lane lines behind the subject vehicle can easily be estimated (recognized) by simply performing the edge detection only to a range ahead of the subject vehicle. The solid substance information detected by the millimeter wave radar 35 is combined with the estimated lane line information behind the subject vehicle, whereby a passing vehicle coming close to the subject vehicle from behind can easily be recognized by the low-cost, simple configuration in which only the millimeter wave radar 35 is added. If there is a recognized passing vehicle within the set distance behind the subject vehicle, the steering angle is corrected toward the direction in which the subject vehicle moves away from the passing vehicle. Therefore, the driving assistance fitting to the driver's feeling can be implemented in consideration of not only the vehicle external environment ahead of the subject vehicle but also the vehicle external environment behind the subject vehicle.

The present invention is not limited to the example described above, and various modifications and changes can be made without departing from the technical scope of the present invention. In the example, the steering system is constituted by a general electric power steering device. Alternatively, for example, a steering system having a steer-by-wire mechanism may be used as the steering system.

In the example, the image information from the stereo cameras are used for recognizing the forward of the subject vehicle. Alternatively, for example, image information from a monocular camera may be used.

In the example, the steering control is performed by the combination of the feedforward control and the feedback control. Alternatively, for example, the steering control may be performed only by either one of the feedback control and the feedforward control. Even in the case that the steering control is performed by the combination of the feedforward control and the feedback control, the correction for a passing vehicle may be performed only with respect to at least either one of the feedback control and the feedforward control.

In the example, a solid substance behind the subject vehicle is recognized using the millimeter wave radar. Alternatively, for example, a laser radar, an infrared radar, and a camera may appropriately be used.

The invention claimed is:

1. A vehicle driving assistance device comprising:
   a forward environment recognizing unit to recognize forward environment including right and left lane lines ahead of a subject vehicle;
   a steering controlling unit to set a steering angle independently of a driver input based on the lane lines ahead of the subject vehicle;
   a backward lane line estimating unit to estimate lane lines behind the subject vehicle based on the lane lines ahead of the subject vehicle and a running state of the subject vehicle;
   a solid substance detecting unit to detect a solid substance behind the subject vehicle;
   a passing vehicle determining unit to determine whether there is a passing vehicle on an adjacent lane based on the lane lines behind the subject vehicle and the solid substance behind the subject vehicle; and
   a correcting unit to correct the steering angle set by the steering controlling unit toward a direction in which the subject vehicle moves away from the passing vehicle if there is a passing vehicle within a set distance behind the subject vehicle.

2. The vehicle driving assistance device according to claim 1, wherein the correcting unit corrects the steering angle by offsetting a steering angle control target set based on the lane lines ahead of the subject vehicle toward a direction in which the subject vehicle moves away from the passing vehicle.

3. The vehicle driving assistance device according to claim 1, wherein the steering controlling unit includes at least either one of a feedforward controlling unit and a feedback controlling unit, the feedforward controlling unit being configured to calculate an output value as a feedforward output value according to shapes of the right and left lane lines recognized by the forward environment recognizing unit, the feedback controlling unit being configured to calculate an output value as a feedback output value according to the shapes of the right and left lane lines recognized by the forward environment recognizing unit and the running state of the subject vehicle; and
   the correcting unit corrects at least either one of the feedforward output value and the feedback output value.

4. The vehicle driving assistance device according to claim 2, wherein
   the steering controlling unit includes at least either one of a feedforward controlling unit and a feedback controlling unit, the feedforward controlling unit being configured to calculate an output value as a feedforward output value according to shapes of the right and left lane lines recognized by the forward environment recognizing unit, the feedback controlling unit being configured to calculate an output value as a feedback output value according to the shapes of the right and left lane lines recognized by the forward environment recognizing unit and the running state of the subject vehicle; and
   the correcting unit corrects at least either one of the feedforward output value and the feedback output value.

5. The vehicle driving assistance device according to claim 1, wherein
   the forward environment recognizing unit includes a camera, and
   the solid substance detecting unit includes a radar.

6. A vehicle driving assistance device mounted on a vehicle, the device comprising:
   a front detector configured to detect forward environment including right and left lane lines ahead of the vehicle;
   a back detector configured to detect a solid substance behind the vehicle; and
   a processor configured to:
      set a steering angle independently of a driver input based on the lane lines ahead of the vehicle;
      estimate lane lines behind the vehicle based on the lane lines ahead of the vehicle and a running state of the vehicle;
      determine whether there is a passing vehicle in an adjacent lane based on the lane lines behind the vehicle and the solid substance behind the vehicle; and
      correct the steering angle set toward a direction in which the vehicle moves away from the passing vehicle if there is a passing vehicle within a set distance behind the vehicle.

7. The vehicle driving assistance device according to claim 6, wherein the processor is further configured to correct the steering angle by offsetting a steering angle control target set based on the lane lines ahead of the vehicle toward a direction in which the vehicle moves away from the passing vehicle.

8. The vehicle driving assistance device according to claim 6, wherein
   the processor is further configured to have at least one of a feedforward controlling function and a feedback controlling function,
   the processor is configured to, when performing the feedforward controlling function, calculate an output value as a feedforward output value according to shapes of the right and left lane lines detected by the front detector, and when performing the feedback controlling function, calculate an output value as a feedback output value according to the shapes of the right and left lane lines recognized by the front detector and the running state of the vehicle, and
   the processor is further configured to correct at least one of the feedforward output value and the feedback output value.

9. The vehicle driving assistance device according to claim 7, wherein
   the processor is further configured to have at least one of a feedforward controlling function and a feedback controlling function,
   the processor is configured to, when performing the feedforward controlling function, calculate an output value as a feedforward output value according to shapes of the right and left lane lines detected by the front detector, and when performing the feedback controlling function, calculate an output value as a feedback output value according to the shapes of the right and left lane lines recognized by the front detector and the running state of the vehicle, and the processor is further configured to correct at least one of the feedforward output value and the feedback output value.

10. The vehicle driving assistance device according to claim 6, wherein
the front detector includes a camera, and
the back detector includes a radar.

\* \* \* \* \*